United States Patent
Xiang et al.

(10) Patent No.: US 12,473,061 B2
(45) Date of Patent: Nov. 18, 2025

(54) ADAPTIVE STSMC HIERARCHICAL CONTROL METHOD FOR DEPTH TRACKING ORIENTED TO UNDERWATER VEHICLE

(71) Applicant: HUAZHONG UNIVERSITY OF SCIENCE AND TECHNOLOGY, Hubei (CN)

(72) Inventors: Xianbo Xiang, Hubei (CN); Xinyang Xiong, Hubei (CN); Shaolong Yang, Hubei (CN); Gong Xiang, Hubei (CN); Yan Wang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 19/075,813

(22) Filed: Mar. 11, 2025

(65) Prior Publication Data
US 2025/0296669 A1    Sep. 25, 2025

(30) Foreign Application Priority Data
Mar. 19, 2024    (CN) .......................... 202410314880.3

(51) Int. Cl.
B63G 8/00    (2006.01)
B63B 79/40    (2020.01)

(52) U.S. Cl.
CPC .............. *B63G 8/001* (2013.01); *B63B 79/40* (2020.01); *B63G 2008/002* (2013.01)

(58) Field of Classification Search
CPC .... B63G 8/001; B63G 2008/002; B63B 79/40
See application file for complete search history.

(56) References Cited

FOREIGN PATENT DOCUMENTS

| CN | 114721409 |   | 7/2022 |
|----|-----------|---|--------|
| CN | 116394258 | * | 7/2023 |
| CN | 118092482 | * | 5/2024 |

* cited by examiner

*Primary Examiner* — Russell Frejd
(74) *Attorney, Agent, or Firm* — JCIPRNET

(57) ABSTRACT

This disclosure provides an adaptive STSMC hierarchical control method for depth tracking of an underwater vehicle. The method includes: using an adaptive line-of-sight guidance algorithm to estimate the vehicle's angle of attack in real time and obtain an expected pitch angle; employing a nonlinear interference observer based on a sliding mode surface error to detect unknown interference; and applying an STSMC controller with adaptive saturation compensation to determine the expected control rudder angle from the sliding mode surface error, the expected pitch angle, and the observed interference. The adaptive saturation compensation corrects the rudder angle based on the saturation deviation, which is determined by the previously calculated expected control rudder angle and the actual output rudder angle at the previous moment. By introducing an adaptive saturation compensator in the dynamic control layer, the issue of rudder angle saturation is mitigated, thereby enhancing both control performance and stability.

13 Claims, 8 Drawing Sheets

ADAPTIVE STSMC HIERARCHICAL CONTROL METHOD FOR DEPTH TRACKING ORIENTED TO UNDERWATER VEHICLE

CROSS-REFERENCE TO RELATED APPLICATION

This application claims the priority benefit of China application serial no. 202410314880.3, filed on Mar. 19, 2024. The entirety of the above-mentioned patent application is hereby incorporated by reference herein and made a part of this specification.

BACKGROUND

Technical Field

The disclosure belongs to the technical field of underwater robot control, and particularly relates to an adaptive super-twisting sliding mode (STSMC) hierarchical control method for depth tracking oriented to an underwater vehicle.

Description of Related Art

At present, with the growing demand for marine resource development, autonomous underwater vehicles play a crucial role in tasks such as seabed mapping, underwater oil and gas pipeline inspection, underwater fishing, search and rescue. These applications not only expand our cognitive boundaries of the ocean but also promote innovation and development of related technologies. However, in order to fully exploit the potential of underwater vehicles, achieving high-precision depth tracking control has become a key technical challenge that needs to be urgently addressed. Firstly, due to the strong coupling and high nonlinearity inherent in the dynamics of underwater vehicles, traditional control methods often struggle to cope with its complex motion characteristics. Secondly, the underwater environment is complex and variable, and various external interference such as currents, waves, temperature, and salinity changes may affect the depth tracking performance of underwater vehicles. Thirdly, in practical applications, it is often difficult to accurately obtain the hydrodynamic parameters of underwater vehicles, which may lead to significant deviations between the actual control effect and the expected result, thereby reducing the depth tracking performance of underwater vehicles. Finally, the thrusters of the underwater vehicle are subject to maximum output limits. When the control command exceeds these limits, control saturation truncation occurs, leading to a mismatch between the control signal and the actuator output, which affects the stability of the control system.

SUMMARY

In view of the defects of the related art, the purpose of the disclosure is to provide an adaptive STSMC hierarchical control method for depth tracking oriented to an underwater vehicle, aiming to solve the problem of poor depth tracking performance of existing underwater vehicles.

To achieve the above purpose, in the first aspect, the disclosure provides an adaptive STSMC hierarchical control method for depth tracking oriented to underwater vehicle, which includes the following.

A three-layer hierarchical control system based on the motion control layer, state observation layer, and dynamic control layer is designed, which enhances the control performance of the system.

An adaptive line-of-sight guidance algorithm is adopted to estimate an angle of attack of the underwater vehicle in real time, so as to obtain an expected pitch angle of the underwater vehicle.

A nonlinear interference observer is adopted based on a sliding mode surface error to observe unknown interference of the underwater vehicle.

An STSMC controller with adaptive saturation compensation is adopted to obtain an expected control rudder angle of the underwater vehicle in combination with the sliding mode surface error, the expected pitch angle, and an observed value of the unknown interference. The adaptive saturation compensation is to compensate the rudder angle according to the saturation deviation of the rudder angle, and the saturation deviation of the rudder angle is determined by the expected control rudder angle calculated at the previous moment and the actual output rudder angle at the previous moment.

It may be understood that, firstly, the disclosure introduces the adaptive line-of-sight guidance algorithm in a kinematic control layer, which may estimate the angle of attack in real time and effectively reduce the impact of unknown interference on guidance accuracy. Secondly, the nonlinear interference observer based on a sliding mode surface error is proposed in a state observation layer to improve the observation accuracy and convergence rate for complex time-varying interference. Finally, the STSMC controller with an adaptive saturation compensator is proposed in a dynamic control layer to enhance the robustness of the underwater vehicle in the face of transient interference and reduce the potential instability caused by control input saturation truncation.

It should be noted that, in order to reduce the adverse effects caused by the control rudder angle input saturation constraint when the system deals with extreme deviations, the disclosure designs a rudder angle adaptive saturation compensator related to the dynamic control layer. This compensator may effectively solve the problem of rudder angle saturation and improve the depth tracking performance of the underwater vehicle.

In a possible implementation, the nonlinear interference observer includes the following formulas:

$$\begin{cases} \hat{H}_{\theta d} = \alpha_\theta + L_\theta \theta_s \\ \dot{\alpha}_\theta = -L_\theta \alpha_\theta - L_\theta(L_\theta \theta_s + A_{\theta m} + B_{\theta s}\delta_s - \ddot{\theta}_d + \lambda_s \dot{\theta}_e) \end{cases}$$

Where $\hat{H}_{\theta d}$ represents the unknown interference observed by the observer, $L_\theta$ represents the parameter of the nonlinear interference observer, $\alpha_\theta$ represents the auxiliary variable of the nonlinear interference observer, $\dot{\alpha}_\theta$ represents the first order differential of $\alpha_\theta$, $\theta_s$ represents the sliding mode surface error, $A_{\theta m}$ and $B_{\theta s}$ represent parameters related to the underwater vehicle, $\theta_d$ represents the expected pitch angle, $\dot{\theta}_d$ represents the second order differential of the expected pitch angle, $\theta_d$ and $\ddot{\theta}_d$ will be obtained by the adaptive line-of-sight guidance algorithm, $\lambda_s$ represents the sliding mode surface gain coefficient, and $\dot{\theta}_e$ represents the first order differential of the pitch angle tracking error.

In a possible implementation, the sliding mode surface error is designed as $\theta_s$ $$\theta_s = \dot{\theta}_e + \lambda_s \theta_e.$$

Where $\theta_e$ represents the pitch angle tracking error. The pitch angle tracking error is obtained by subtracting the expected pitch angle from the actual pitch angle. The actual pitch angle can be obtained by the onboard attitude sensor, such as the Inertial Measurement Unit (IMU).

In a possible implementation, the expected control rudder angle is designed as $\delta_s$ $$\delta_s = \left(-k_\alpha |\theta_s|^{\frac{1}{2}} \text{sign}(\theta_s) - \int_0^\tau k_\gamma \text{sign}(\theta_s) d\tau - A_{\theta m} - \hat{H}_{\theta d} + \ddot{\theta}_d - \lambda_s \dot{\theta}_e\right)/B_{\theta s} + \delta_c.$$

Where $k_\alpha$ and $k_\gamma$ are parameters of STSMC, sign(·) represents the sign function, $\tau$ represents time, $\int_0^\tau k_\gamma$ sign $(\theta_s) d\tau$ represents the integral of $k_\gamma$sign $(\theta_s)$ within the [0, t] time interval, $\theta_e$ represents the pitch angle tracking error, determined by the error between the expected pitch angle and the actual pitch angle, and $\delta_c$ represents the compensating rudder angle determined according to the saturation deviation of the rudder angle.

In a possible implementation, the compensating rudder angle is designed as $\delta_c$ $$\delta_c = K_c \vartheta$$
$$\dot{\vartheta} = -K_\vartheta \vartheta + \Delta_\delta$$
$$\Delta_\delta = \delta_u - \delta_s(k-1)$$
$$\delta_u = \begin{cases} \text{sign}(\delta_s(k-1))\overline{\delta}_s, & |\delta_s(k-1)| \geq \overline{\delta}_s \\ \delta_s(k-1), & |\delta_s(k-1)| < \overline{\delta}_s \end{cases}$$

Where $K_c$ represents the adaptive saturation compensation parameter, $\vartheta$ is an adaptive variable, $\dot{\vartheta}$ is the adaptive law of the adaptive variable $\vartheta$, $K_\vartheta$ represents the adaptive law parameter, $\Delta_\delta$ represents the saturation deviation of the rudder angle; $\delta_u$ represents the actual output rudder angle of the elevator at the previous moment, $\overline{\delta}_s$ represents the rudder angle boundary that the elevator may output, and $\delta_s(k-1)$ represents the expected control rudder angle obtained at the previous moment.

In a possible implementation, the adaptive line-of-sight guidance algorithm includes the following formulas:

$$\begin{cases} \theta_d = \arctan(z_e/D_L + \hat{\alpha}) \\ \dot{\hat{\alpha}} = \dfrac{\kappa U D_L z_e}{\sqrt{D_L^2 + (z_e + D_L\hat{\alpha})^2}} \end{cases}.$$

Where $\theta_d$ represents the expected pitch angle, arctan(·) represents the arctangent function, $Z_e$ represents the depth tracking error, determined by the error between the expected depth and the actual depth of the underwater vehicle, the actual depth of the underwater vehicle can be obtained by the depth gauge, $D_L$ and $\kappa$ represent the adaptive line-of-sight guidance law parameters, $\hat{\alpha}$ represents the estimated angle of attack of the underwater vehicle, $\dot{\hat{\alpha}}$ represents the first order differential of $\hat{\alpha}$, and U represents the resultant velocity of the underwater vehicle in the depth plane.

In the second aspect, the disclosure provides an adaptive STSMC hierarchical control system for depth tracking oriented to an underwater vehicle, which includes the following.

An expected pitch angle determination unit adopts an adaptive line-of-sight guidance algorithm to estimate an angle of attack of the underwater vehicle in real time, so as to obtain an expected pitch angle of the underwater vehicle.

An unknown interference observation unit adopts a nonlinear interference observer based on a sliding mode surface error to observe unknown interference of the underwater vehicle.

A control rudder angle calculation unit adopts an STSMC controller with adaptive saturation compensation in combination with the sliding mode surface error, the expected pitch angle, and the unknown interference to obtain an expected control rudder angle of the underwater vehicle. The adaptive saturation compensation is to compensate the rudder angle according to the saturation deviation of the rudder angle, and the saturation deviation of the rudder angle is determined by the expected control rudder angle calculated at the previous moment and the actual output rudder angle at the previous moment.

In a possible implementation mode, the expected control rudder angle $\delta_s$ calculated by the control rudder angle calculation unit may be:

$$\delta_s = \left(-k_\alpha |\theta_s|^{\frac{1}{2}} \text{sign}(\theta_s) - \int_0^\tau k_\gamma \text{sign}(\theta_s) d\tau - A_{\theta m} - \hat{H}_{\theta d} + \ddot{\theta}_d - \lambda_s \dot{\theta}_e\right)/B_{\theta s} + \delta_c.$$

Where $k_\alpha$ and $k_\gamma$ are parameters of STSMC, $\theta_s$ represents the sliding mode surface error, sign(·) represents the sign function, $\tau$ represents time, $\int_0^\tau k_\gamma$ sign $(\theta_s) d\tau$ represents the integral of $k_\gamma$sign $(\theta_s)$ within the [0, t] time interval, $A_{\theta m}$ and $B_{\theta s}$ represent parameters related to the underwater vehicle, $\hat{H}_{\theta d}$ represents the observed unknown interference, $\theta_d$ represents the expected pitch angle, $\ddot{\theta}_d$ represents the second order differential of the expected pitch angle, $\lambda_s$ represents the sliding mode surface gain coefficient, $\theta_e$ represents the pitch angle tracking error, $\dot{\theta}_e$ represents the first order differential of the pitch angle tracking error, and $\delta_c$ represents the compensating rudder angle determined according to the saturation deviation of the rudder angle.

In a possible implementation, the compensating rudder angle adopted by the control rudder angle calculation unit may be:

$$\delta_c = K_c \vartheta$$
$$\dot{\vartheta} = -K_\vartheta \vartheta + \Delta_\delta$$
$$\Delta_\delta = \delta_u - \delta_s(k-1)$$
$$\delta_u = \begin{cases} \text{sign}(\delta_s(k-1))\overline{\delta}_s, & |\delta_s(k-1)| \geq \overline{\delta}_s \\ \delta_s(k-1), & |\delta_s(k-1)| < \overline{\delta}_s \end{cases}$$

Where $K_c$ represents the adaptive saturation compensation parameter, $\vartheta$ is an adaptive variable, $\dot{\vartheta}$ is an adaptive law of the adaptive variable $\vartheta$, $K_\vartheta$ represents the adaptive law parameter, $\Delta_\delta$ represents the saturation deviation of the rudder angle; $\delta_u$ represents the actual output rudder angle of the elevator at the previous moment, $\overline{\delta}_s$ represents the rudder angle boundary that the elevator may output, and $\delta_s(k-1)$ represents the expected control rudder angle obtained at the previous moment.

In the third aspect, the disclosure provides an electronic device, including: at least one storage medium, for storing programs; and at least one processor, for executing the programs stored in the storage medium. When the programs stored in the storage medium are executed, the processor is used to execute the method described in the first aspect or any possible implementation of the first aspect.

In the fourth aspect, the disclosure provides a computer-readable storage medium, and the computer-readable storage medium stores a computer program. When the computer program is executed on a processor, the processor is caused to execute the method described in the first aspect or any possible implementation of the first aspect.

In the fifth aspect, the disclosure provides a computer program product. When the computer program product is executed on a processor, the processor is caused to execute the method described in the first aspect or any possible implementation of the first aspect.

It may be understood that the beneficial effects of the second aspect to the fifth aspect may be found in the relevant description of the first aspect, so details will not be repeated here.

In general, the above technical solution conceived by the disclosure has beneficial effects as follows compared with the related art.

The disclosure provides an adaptive STSMC hierarchical control method for depth tracking oriented to an underwater vehicle. In response to challenges such as environmental complexity, inaccurate modeling, and perceptual uncertainty, a three-layer hierarchical control method based on distributed processing is designed for underactuated autonomous underwater vehicle systems. This method enhances the resistance to abnormal states and improves system flexibility and control performance through information interaction and sharing between layers. In order to effectively reduce control oscillations and divergence phenomena caused by complex time-varying interference, and significantly weaken transient deviations caused by transient interference, the disclosure designs a finite-time controller based on STSMC, which reduces the system's dependence on precise hydrodynamic parameters of underwater vehicles, and significantly reduces the possible chattering effects of the rudder angle actuator during operation. At the same time, in order to observe the uncertainty of the system in real-time and respond to time-varying interference, the disclosure constructs a nonlinear interference observer based on a sliding mode surface error, aiming to effectively respond to strong transient interference and improve the control performance and stability of underwater vehicles.

The disclosure provides an adaptive STSMC hierarchical control method for depth tracking oriented to an underwater vehicle. In order to weaken the adverse effects caused by control input saturation constraints when the system deals with extreme deviations, an adaptive saturation compensator related to the dynamic control layer is designed. This compensator may effectively solve the problem of rudder angle saturation without requiring complex switching strategies and does not have singularity issues.

DESCRIPTION OF THE EMBODIMENTS

In order to make the purpose, technical solutions, and advantages of the disclosure more comprehensible, the disclosure is further described in detail below together with the accompanying drawings and embodiments. It should be understood that the specific embodiments described herein are only used to explain the disclosure, and the embodiments are not used to limit the disclosure.

The term "and/or" described herein is a description of the associative relationship of associated objects, indicating that three types of relationships may exist. For example, A and/or B may represent: A exists alone, A and B exist simultaneously, or B exists alone in these three situations. The symbol "/" described herein indicates that the associated objects are in an "or" relationship. For example, A/B represents A or B.

In the embodiments of the disclosure, words such as "exemplary" or "for example" are used to indicate examples, instances, or illustrations. Any embodiment or design described as "exemplary" or "for example" in the embodiments of the disclosure should not be construed as being preferred or advantageous over other embodiments or designs. Rather, the use of words such as "exemplary" or "for example" are intended to present the relevant concepts in a concrete fashion.

First, for the dynamic coupling characteristics of underwater vehicles, it is necessary to design a more advanced pitch channel guidance rate to handle the coupling effects between the pitch angle and depth error of underwater vehicles. Second, for complex time-varying interference, it is necessary to utilize modern control theories and methods, such as sliding mode control, adaptive control, robust control, etc., to design more effective controllers so as to better handle the nonlinear characteristics and external interference of underwater vehicles, thereby improving the accuracy and stability of depth tracking. Finally, for the perturbation of hydrodynamic parameters in the system, it is necessary to design high-performance state observers to compensate for the control effect deviation caused by model uncertainties.

The purpose of the disclosure is to, under system model uncertainties, complex time-varying and transient interference, firstly, design a control method to achieve adaptive smooth tracking control of the depth surface for underwater vehicles. Secondly, the model uncertainties of underwater vehicles and unknown external interference should be estimated and compensated, the control system should have robustness, and it is necessary to weaken the rudder angle chattering effect to protect the rudder. Thirdly, the control truncation phenomenon that may be caused by rudder angle saturation constraints needs to be weakened to reduce its impact on the stability of underwater vehicles. Finally, the proposed control method should be able to be practically verified through reasonable experiments to ensure its applicability to real operation scenarios of underwater vehicles.

Figure 1:
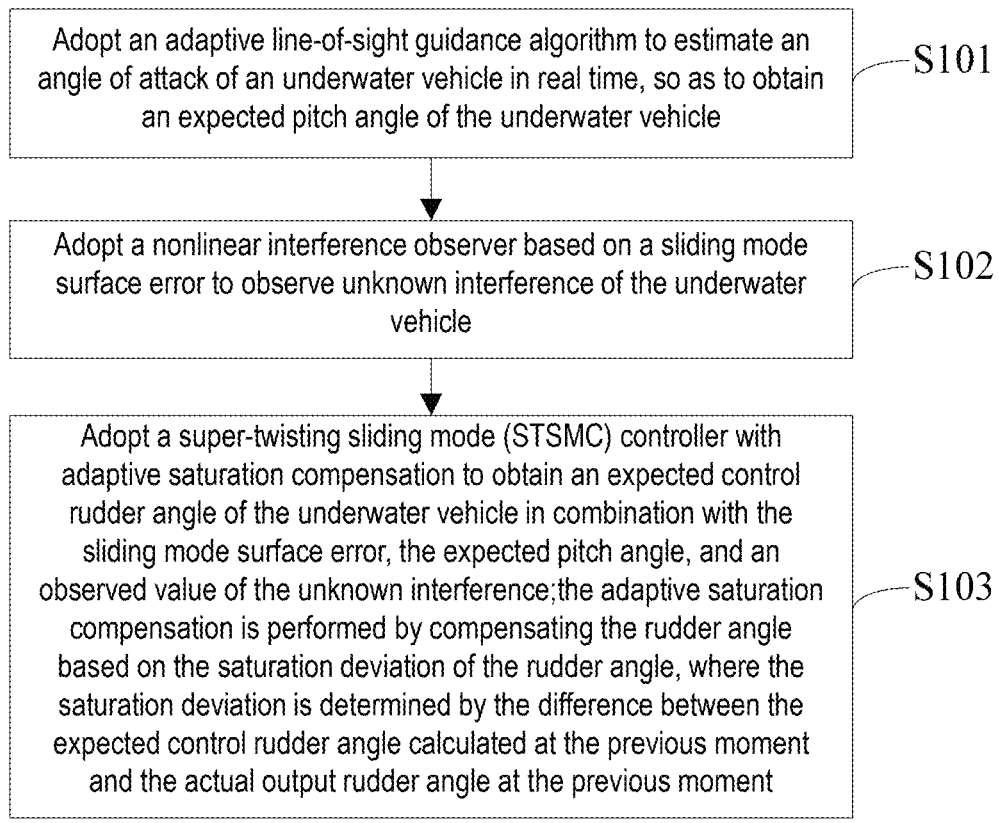
FIG. 1 is a flowchart of an adaptive STSMC hierarchical control method for depth tracking oriented to an underwater vehicle provided by an embodiment of the disclosure.

FIG. 1 is a flowchart of an adaptive STSMC hierarchical control method for depth tracking oriented to an underwater vehicle provided by an embodiment of the disclosure. As shown in FIG. 1, the method includes the following steps.

S101. An adaptive line-of-sight guidance algorithm is adopted to estimate an angle of attack of the underwater vehicle in real time, so as to obtain the expected pitch angle of the underwater vehicle.

S102. A nonlinear interference observer is adopted based on a sliding mode surface error to observe unknown interference of the underwater vehicle.

Figure 2:
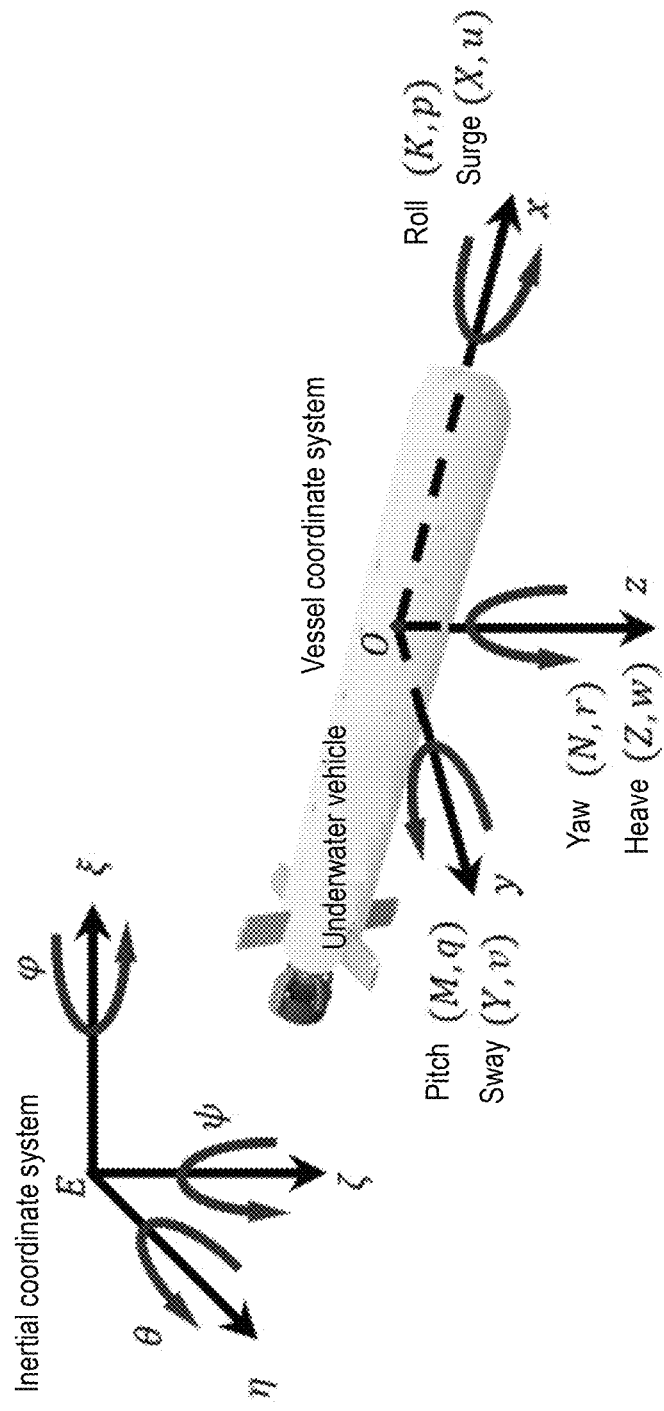
FIG. 2 is a schematic diagram of an underwater vehicle system provided by an embodiment of the disclosure.

S103. A super-twisting sliding mode (STSMC) controller with adaptive saturation compensation is adopted to obtain an expected control rudder angle of the underwater vehicle in combination with the sliding mode surface error, the expected pitch angle, and an observed value of the unknown interference. The adaptive saturation compensation is to compensate the rudder angle according to the saturation deviation of the rudder angle, and the saturation deviation of the rudder angle is determined by the expected control rudder angle calculated at the previous moment and the actual output rudder angle at the previous moment. In the embodiment, The expected control rudder angle calculated by the STSMC controller is transmitted to the elevator rudder actuator of the underwater vehicle to physically adjust the underwater vehicle's pitch angle and depth. During this process, the actual output rudder angle is obtained through a rudder angle sensor installed on the elevator rudder. This actual output rudder angle data is used to calculate the saturation deviation for adaptive saturation compensation in subsequent control cycles FIG. 2 is a schematic diagram of an underwater vehicle system provided by an embodiment of the disclosure. As shown in FIG. 2, the basic parameters of the underwater vehicle system used in this embodiment may be as shown in Table 1.

TABLE 1

Basic parameters of underwater vehicle system

| parameter name | parameter description | parameter value |
| --- | --- | --- |
| M | mass of underwater vehicle | 8.25 kg |
| L | underwater vehicle length | 1.07 m |
| D | equivalent diameter of underwater vehicle | 0.16 m |
| W | gravity of underwater vehicle | 80.85N |
| B | buoyancy of underwater vehicle | 82.85N |
| $I_{xx}$ | moment of inertia-X of underwater vehicle | 0.02579 kg · m$^2$ |

TABLE 1-continued

Basic parameters of underwater vehicle system

| parameter name | parameter description | parameter value |
| --- | --- | --- |
| $I_{yy}$ | moment of inertia-Y of underwater vehicle | 0.50789 kg · m$^2$ |
| $I_{zz}$ | moment of inertia-Z of underwater vehicle | 0.50789 kg · m$^2$ |

Figure 3:
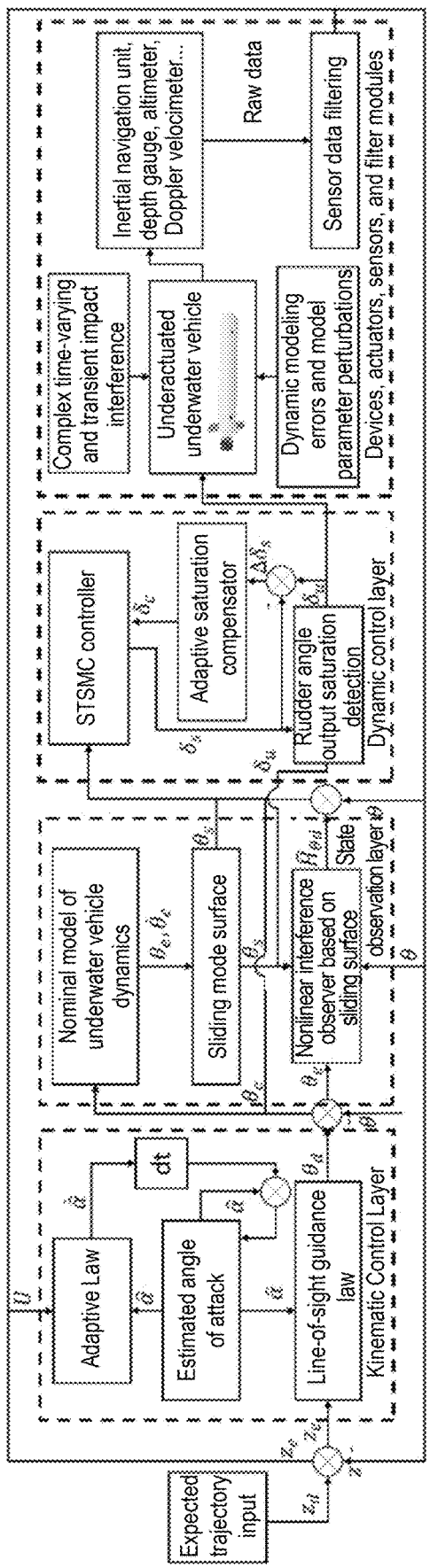
FIG. 3 is a schematic diagram of an adaptive STSMC hierarchical control process for depth tracking oriented to an underwater vehicle provided by an embodiment of the disclosure.

FIG. 3 is a schematic diagram of an adaptive STSMC hierarchical control process for depth tracking oriented to an underwater vehicle provided by an embodiment of the disclosure. In FIG. 3, $Z_d$ is the expected depth, Z is the real-time depth, U is the real-time velocity, $\theta$ is the real-time pitch angle, and q is the real-time pitch angle velocity. The depth error $Z_e$ may be obtained by smoothing the expected depth $Z_d$ through a tracking differentiator and then subtracting the real-time depth Z.

Specifically, the disclosure designs a three-layer hierarchical robust control method oriented to an underwater vehicle. Firstly, the adaptive line-of-sight guidance algorithm is introduced in a kinematic control layer, which may estimate the angle of attack in real time and effectively reduce the impact of unknown interference on guidance accuracy. Secondly, the nonlinear interference observer based on a sliding mode surface error is proposed in a state observation layer to improve the observation accuracy and convergence rate for complex time-varying interference. Finally, the STSMC controller with an adaptive saturation compensator is proposed in a dynamic control layer to enhance the robustness of the underwater vehicle in the face of transient interference and reduce the potential instability caused by control input saturation truncation. The controller is:

$$\delta_s = \left(-k_\alpha |\theta_s|^{\frac{1}{2}} \text{sign}(\theta_s) - \int_0^t k_\gamma \text{sign}(\theta_s) d\tau - A_{\theta m} - \hat{H}_{\theta d} + \ddot{\theta}_d - \lambda_s \dot{\theta}_e\right)/B_{\theta s} + \delta_c$$

Where $\delta_s$ represents the expected rudder angle of the underwater vehicle output by the controller, which is an abbreviation of the expected rudder angle $\delta_s(k)$ calculated at the current moment k, $k_\alpha > 0$ and $k_\gamma > 0$ are parameters to be designed for the controller, $\theta_s$ represents the designed pitch angle error sliding mode surface, sign(·) represents the sign function, $\tau$ represents time, $\int_0^t k_\gamma$ sign ($\theta_s$)d$\tau$ represents the integral of $k_\gamma$sign ($\theta_s$) within the [0, t] time interval, $A_{\theta m}$ and $B_\theta$s represent parameters related to the underwater vehicle model, $\hat{H}_{\theta d}$ represents the observed value of unknown interference by the nonlinear interference observer, $\ddot{\theta}_d$ represents the expected pitch angle of the underwater vehicle calculated by the adaptive line-of-sight guidance law, $\lambda_s$ represents the sliding mode surface parameter, $\dot{\theta}_e$ represents the pitch angle tracking error of the underwater vehicle, and $\delta_c$ represents the compensated rudder angle output by the adaptive saturation compensator. After the controller completes its calculations, the expected rudder angle $\delta_s$ will be output as a control command to the actuator, such as a servo motor, which then drives the rudder surface of the vehicle to rotate, achieving the navigation control.

Exemplarily, the adaptive line-of-sight guidance algorithm may be as follows.

$$\begin{cases} \theta_d = \arctan(z_e/D_L + \hat{\alpha}) \\ \dot{\hat{\alpha}} = \dfrac{\kappa U D_L z_e}{\sqrt{D_L^2 + (z_e + D_L\hat{\alpha})^2}} \end{cases}$$

Where $\theta_d$ represents the expected pitch angle of the underwater vehicle calculated by the adaptive line-of-sight guidance algorithm, arctan (·) represents the arctangent function, $z_e$ represents the depth tracking error of the underwater vehicle, $D_L$ and $\kappa$ represent the parameters to be designed for the line-of-sight angle guidance law, $\hat{\alpha}$ represents the estimated angle of attack of the underwater vehicle, $\dot{\hat{\alpha}}$ represents the adaptive law for estimating angle of attack of the underwater vehicle, and U represents the resultant velocity of the underwater vehicle in the depth plane.

The nonlinear interference observer based on a sliding mode surface error may be as follows.

$$\begin{cases} \hat{H}_{\theta d} = \alpha_\theta + L_\theta \theta_s \\ \dot{\alpha}_\theta = -L_\theta \alpha_\theta - L_\theta\left(L_\theta \theta_s + A_{\theta m} + B_{\theta s}\delta_s - \ddot{\theta}_d + \lambda_s \dot{\theta}_e\right) \end{cases}.$$

Where, $\hat{H}_{\theta d}$ represents the observation result of unknown interference by the nonlinear interference observer, $L_\theta$ represents the parameters to be designed for the observer, $\alpha_\theta$ represents the auxiliary variable of the interference observer, and de represents the adaptive law of this auxiliary variable.

The adaptive saturation compensator may be as follows.

$$\delta_c = K_c \partial$$

Where $\delta_c$ is the compensated rudder angle output by the adaptive saturation compensator, $K_c$ represents the parameters to be designed for the adaptive saturation compensator, and $\partial$ is the auxiliary adaptive variable of the adaptive saturation compensator.

The adaptive rate of the auxiliary adaptive variable $\partial$ of the adaptive saturation compensator may be as follows.

$$\dot{\partial} = -K_\partial \partial + \Delta_\delta$$

Where $K_\partial$ represents the adaptive law parameters to be designed, and $\Delta_\delta$ represents the saturation deviation of the rudder angle.

The saturation deviation of the rudder angle may be as follows.

$$\Delta_\delta = \delta_u - \delta_s(k-1)$$

Where, $\delta_u$ represents the actual output rudder angle:

$$\delta_u = \begin{cases} \mathrm{sign}(\delta_s(k-1))\overline{\delta}_s, & |\delta_s(k-1)| \geq \overline{\delta}_s \\ \delta_s(k-1), & |\delta_s(k-1)| < \overline{\delta}_s \end{cases}$$

Where $\overline{\delta}_s$ represents the upper limit of the rudder angle output, and $\delta_s(k-1)$ represents the expected control rudder angle obtained at the previous moment k-1.

It may be understood that all parameters required in the calculation processes involved in the disclosure may be determined by those skilled in the art based on experience or experimental simulation, with the aim of obtaining the best control effect. The disclosure does not impose any limitations on specific parameter values. The control effect refers to effects such as depth tracking and pitch angle tracking, namely the tracking effect between real-time depth and expected depth, and the tracking effect between real-time pitch angle and expected pitch angle.

Figure 4:
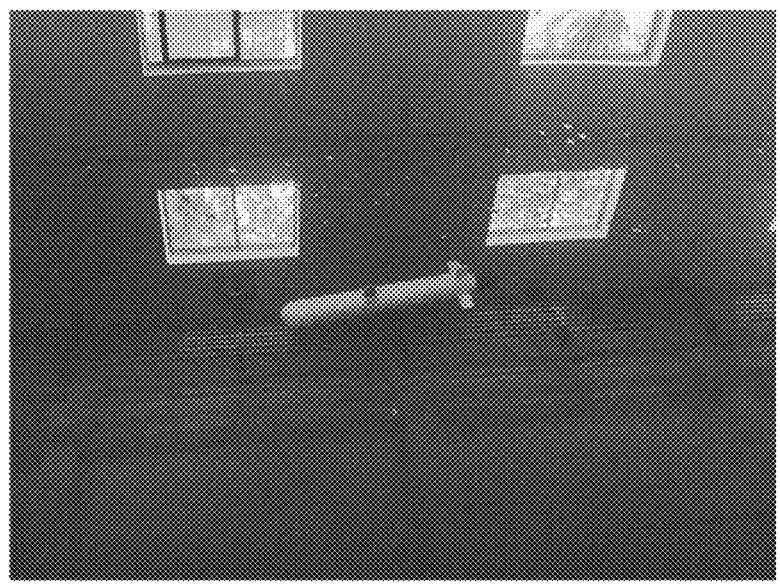
FIG. 4 is a schematic diagram of an experimental verification scenario for underwater vehicle depth tracking provided by an embodiment of the disclosure.
Figure 5:
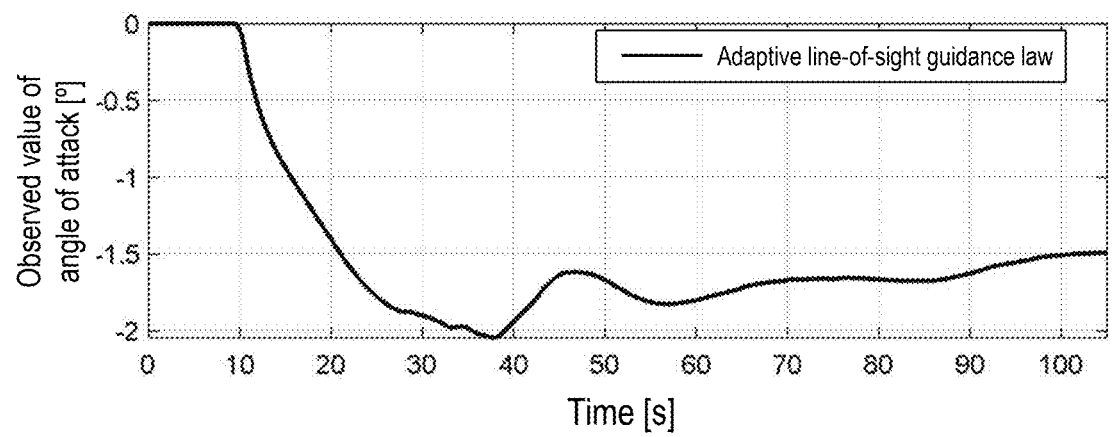
FIG. 5 is a curve diagram of the angle of attack and interference observation based on adaptive guidance law and nonlinear interference observer provided by an embodiment of the disclosure.
Figure 5:
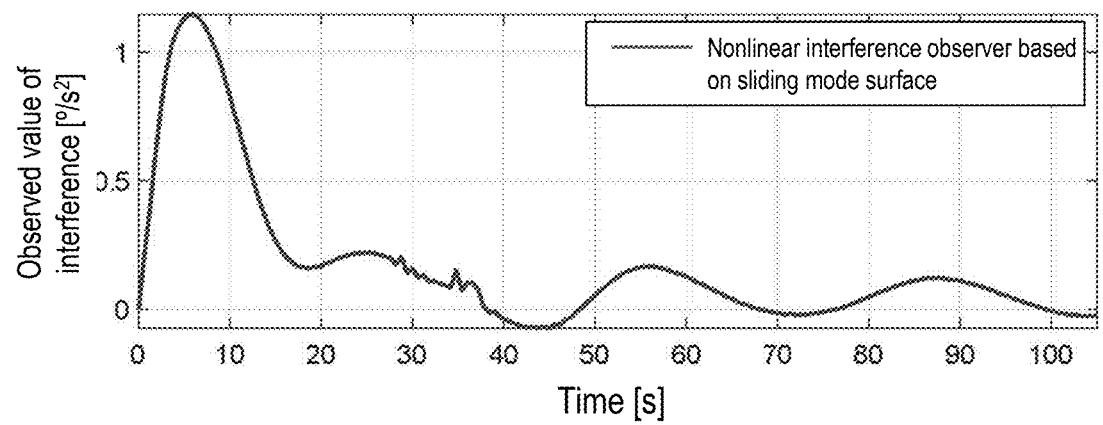

In a specific embodiment, this embodiment adopts a pool test method to verify the effectiveness and advancement of the method proposed in the disclosure. The pool test scenario is shown in FIG. 4, where the underwater vehicle performs depth tracking control tests. To verify the effectiveness and advancement of the method proposed in the disclosure, a comparative test was conducted using a proportional-integral-derivative controller based on adaptive line-of-sight guidance law (ALOS-PID). To simulate the complex interference experienced by the underwater vehicle, firstly, a sinusoidal interference signal was artificially superimposed on the control signal output by the underwater vehicle control system. Secondly, during navigation, the water suction and drainage system in the sealed cabin of the underwater vehicle was used for water suction to simulate transient interference. The two curves in FIG. 5 respectively show the angle of attack of the underwater vehicle observed by the adaptive line-of-sight guidance law and the external interference estimated by the nonlinear interference observer, reflecting the effectiveness of the simulated complex interference algorithm, which may assist in subsequent effective verification of the disclosure's scheme.

Figure 6:
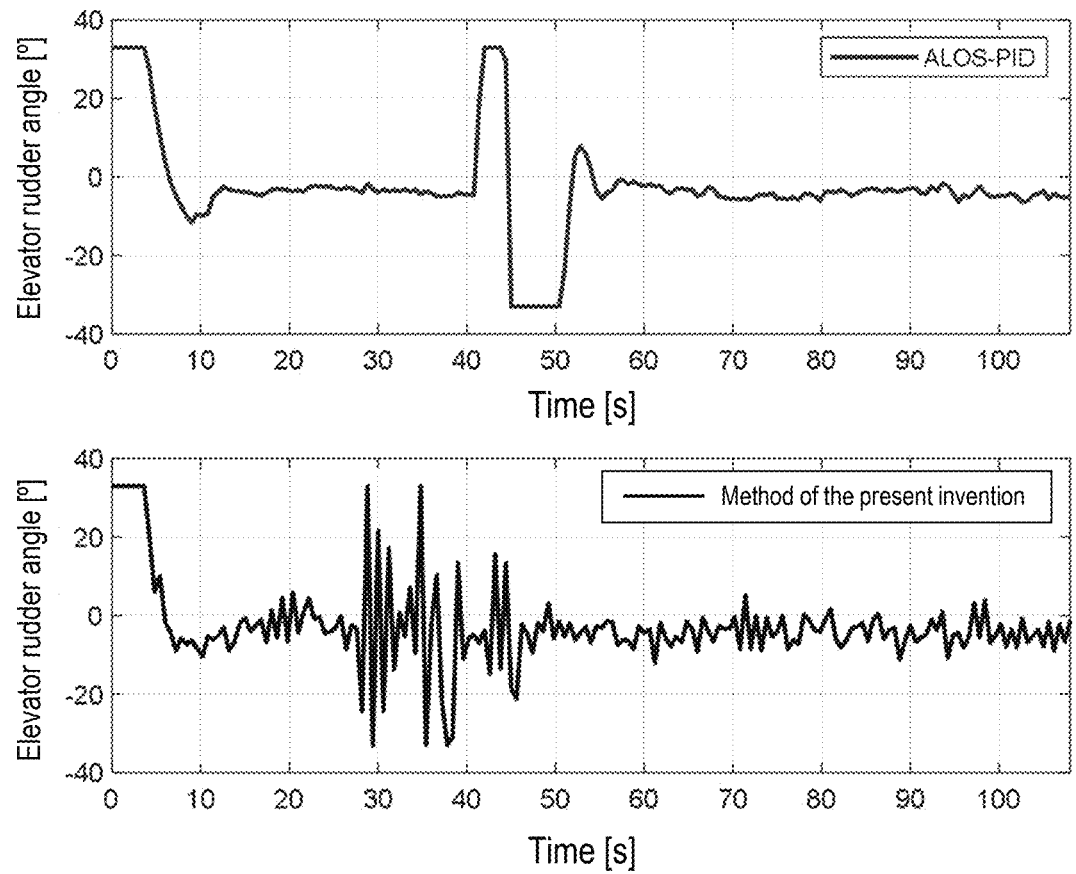
FIG. 6 is a curve diagram of an elevator rudder angle of an underwater vehicle provided by an embodiment of the disclosure.

The test results are shown as follows. FIG. 6 displays the elevator rudder angle curves of the two control algorithms. Although the method proposed in the disclosure has slight chattering, it shows significant improvement in the control performance compared to the traditional sliding mode algorithm. Moreover, this slight chattering provides additional robustness to the system, enabling the system to overcome transient interference, as specifically shown in FIG. 7 and FIG. 8 below.

Figure 7:
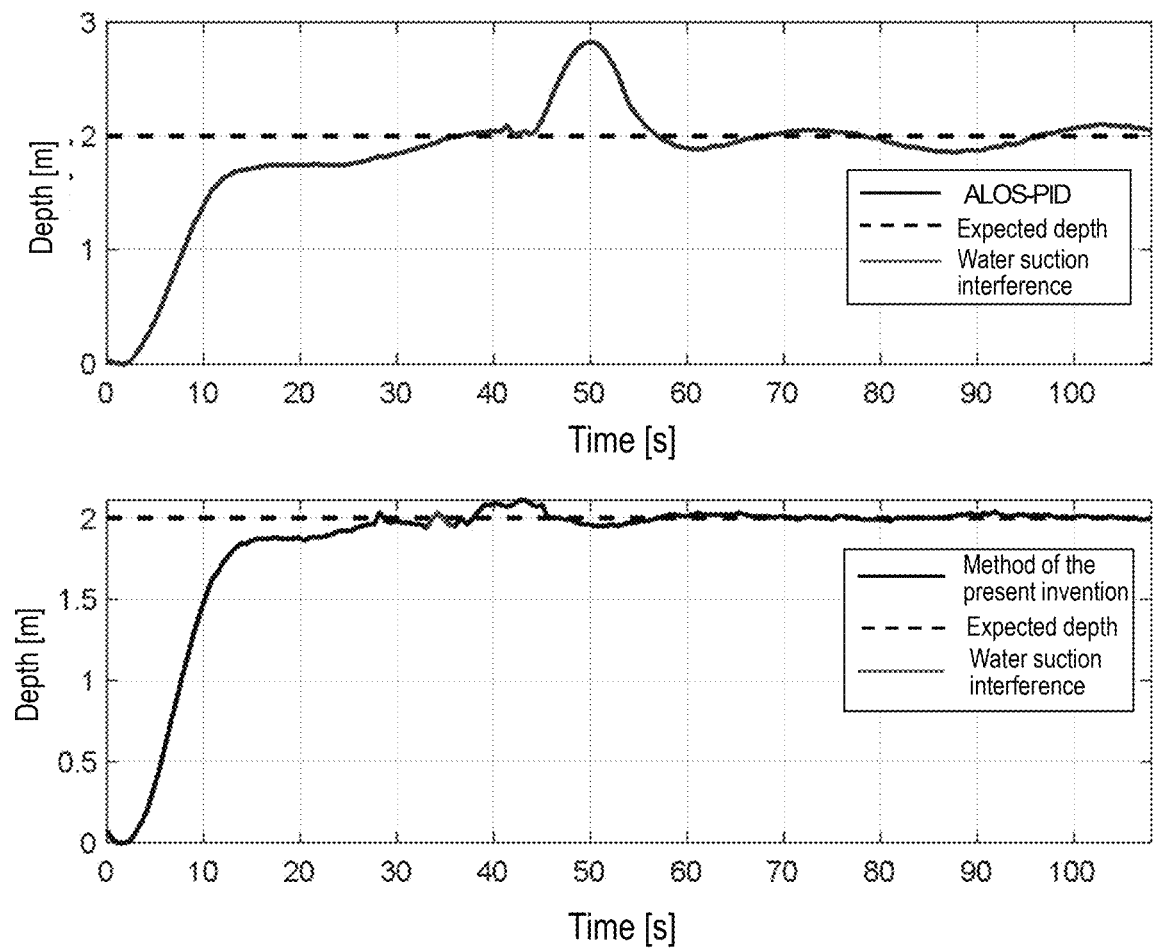
FIG. 7 is a curve diagram of depth tracking control of an underwater vehicle provided by an embodiment of the disclosure.
Figure 8:
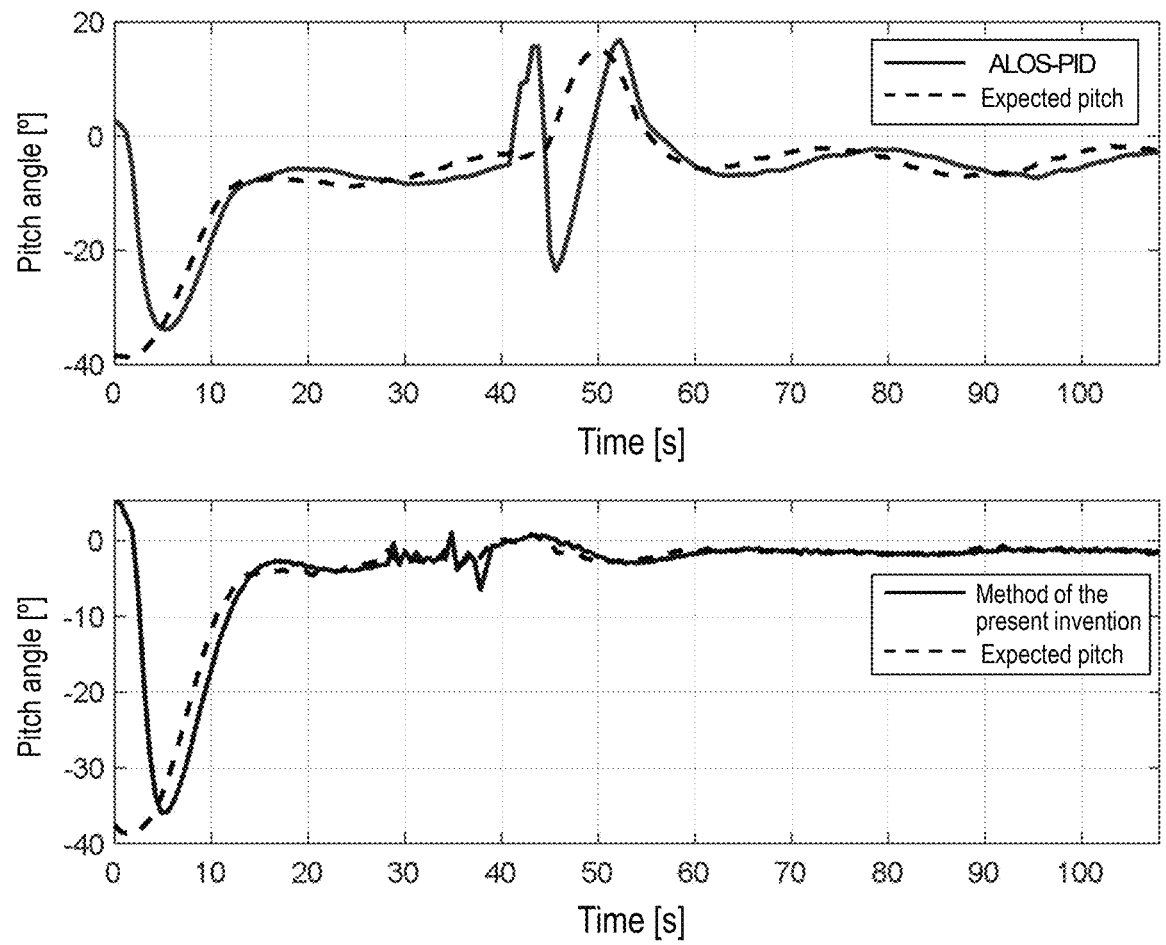
FIG. 8 is a curve diagram of pitch angle tracking control of an underwater vehicle provided by an embodiment of the disclosure.

FIG. 7 shows the depth tracking control performance of the two control methods under complex interference. From the curves, it can be clearly seen that ALOS-PID struggles to resist the transient interference caused by the water suction and drainage system, with a maximum depth deviation reaching 0.82 m, while the controller proposed in the disclosure has a maximum depth deviation of only 0.13 m under the influence of transient interference. After returning to steady state, the average steady-state error of ALOS-PID is 0.128 m, while the average steady-state error of the method proposed in the disclosure is 0.012 m. FIG. 8 shows the tracking performance of the two control methods for the expected pitch angle. Combined with FIG. 8, it can be seen that the method proposed in the disclosure has higher tracking accuracy.

In summary, it can be seen that in FIG. 6, the elevator rudder angle in the ALOS-PID control algorithm becomes saturated, i.e., the interval in which the rudder angle reaches and remains at the upper or lower boundary without change. Accordingly, in FIG. 7, the depth under the ALOS-PID control algorithm produces a huge deviation, and in FIG. 8, the expected pitch angle error under the ALOS-PID control algorithm increases sharply. In contrast, the control algorithm provided by the disclosure, through slight chattering of the elevator rudder angle in FIG. 6, provides additional robustness to the system, resulting in significantly reduced depth deviation and expected pitch angle error in FIG. 7 and FIG. 8 compared to the ALOS-PID control algorithm, greatly improving the system's performance and steady-state.

Therefore, it may be understood that under the influence of transient interference, the rudder angle in the ALOS-PID algorithm exhibits persistent saturation, resulting in loss of rudder effectiveness and reduced control accuracy. In contrast, the algorithm proposed in the disclosure, under the action of the saturation compensator, eliminates the persistent saturation phenomenon of the rudder angle and further improves the depth tracking control performance.

The disclosure discloses an adaptive STSMC hierarchical control method for depth tracking oriented to an underwater vehicle. Firstly, for underactuated autonomous underwater vehicles, a three-layer hierarchical control system based on kinematic control layer, state observation layer, and dynamic control layer is designed, which improves the control performance of the system. Secondly, to enhance guidance accuracy and stability, an adaptive line-of-sight guidance law is proposed to estimate an angle of attack in real-time, effectively mitigating the impact of unknown interference on guidance accuracy. Thirdly, to address interference uncertainties, the disclosure proposes a finite-time control law based on STSMC, combined with a nonlinear interference observer based on a sliding mode surface error, which enhances the robustness of the system and may effectively cope with transient impact interference. Furthermore, this method reduces sensitivity to model accuracy and effectively alleviates the rudder angle chattering phenomenon. Finally, an adaptive saturation compensator is proposed to overcome the performance degradation problem caused by control input saturation constraints.

Figure 9:
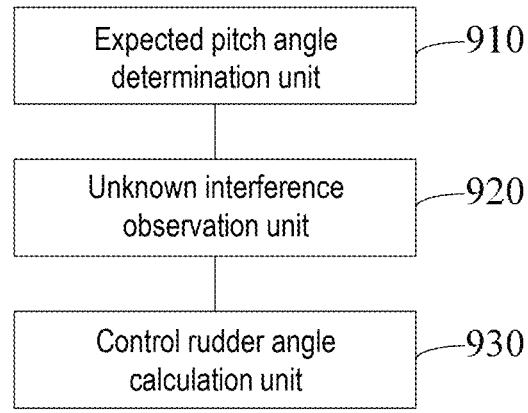
FIG. 9 is a structural diagram of an adaptive STSMC hierarchical control system for depth tracking oriented to an underwater vehicle provided by an embodiment of the disclosure.

FIG. 9 is a structural diagram of an adaptive STSMC hierarchical control system for depth tracking oriented to an underwater vehicle provided by an embodiment of the disclosure. As shown in FIG. 9, the system includes the following.

An expected pitch angle determination unit 910 adopts an adaptive line-of-sight guidance algorithm to estimate an angle of attack of the underwater vehicle in real time, so as to obtain an expected pitch angle of the underwater vehicle.

An unknown interference observation unit 920 adopts a nonlinear interference observer based on a sliding mode surface error to observe unknown interference of the underwater vehicle.

A control rudder angle calculation unit 930 adopts a super-twisting sliding mode (STSMC) controller with adaptive saturation compensation in combination with the sliding mode surface error, the expected pitch angle, and an observed value of the unknown interference to obtain an expected control rudder angle of the underwater vehicle. The adaptive saturation compensation is to compensate the rudder angle according to the saturation deviation of the rudder angle, where the saturation deviation of the rudder angle is determined by the expected control rudder angle calculated at the previous moment and the actual output rudder angle at the previous moment. In an embodiment, the control rudder angle calculation unit 930 further configured to transmit it to the elevator rudder actuator of the underwater vehicle to physically adjust the underwater vehicle's pitch angle and depth. Simultaneously, the control rudder angle calculation unit 930 receives feedback data from a rudder angle sensor coupled to the elevator rudder to obtain the actual output rudder angle, which is used to calculate the saturation deviation for adaptive saturation compensation in subsequent control cycles. FIG. 9 illustrates the relationship of these control components within the overall control system architecture In a possible implementation, the expected control rudder angle calculated by the control rudder angle calculation unit 930 may be as follows.

$$\delta_s = \left(-k_\alpha|\theta_s|^{\frac{1}{2}}\mathrm{sign}(\theta_s) - \int_0^t k_\gamma\mathrm{sign}(\theta_s)d\tau - A_{\theta m} - \hat{H}_{\theta d} + \ddot{\theta}_d - \lambda_s\dot{\theta}_e\right)/B_{\theta s} + \delta_c$$

Where $k_\alpha$ and $k_\gamma$ are parameters of STSMC, $\theta_s$ represents the sliding mode surface error, sign (·) represents the sign function, $\tau$ represents time, $\int_0^t k_\gamma$ sign $(\theta_s)d\tau$ represents the integral of $k_\gamma$sign $(\theta_s)$ within the [0, t] time interval, $A_{\theta m}$ and $B_{\theta s}$ represent parameters related to the underwater vehicle, $\hat{H}_{\theta d}$ represents the observed unknown interference, $\theta_d$ represents the expected pitch angle, a represents the second order differential of the expected pitch angle, $\lambda_s$ represents the sliding mode surface gain coefficient, $\theta_e$ represents the pitch angle tracking error, $\dot{\theta}_e$ represents the first order differential of the pitch angle tracking error, and $\delta_c$ represents the compensating rudder angle determined according to the saturation deviation of the rudder angle.

In a possible implementation, the compensating rudder angle adopted by the control rudder angle calculation unit 930 may be as follows.

$$\delta_c = K_c\vartheta$$

$$\dot{\vartheta} = -K_\vartheta\vartheta + \Delta_\delta$$

$$\Delta_\delta = \delta_u - \delta_s(k-1)$$

$$\delta_u = \begin{cases} \mathrm{sign}(\delta_s(k-1))\overline{\delta}_s, & |\delta_s(k-1)| \geq \overline{\delta}_s \\ \delta_s(k-1), & |\delta_s(k-1)| < \overline{\delta}_s \end{cases}$$

Where $K_c$ represents the adaptive saturation compensation parameter, $\vartheta$ is an adaptive variable, $\dot{\vartheta}$ is the adaptive law of the adaptive variable $\vartheta$, $K_\vartheta$ represents the adaptive law parameter, $\Delta_\delta$ represents the saturation deviation of the rudder angle; $\delta_u$ represents the actual output rudder angle of the elevator at the previous moment, $\overline{\delta}_s$ represents the rudder angle boundary that the elevator may output, and $\delta_s(k-1)$ represents the expected control rudder angle obtained at the previous moment.

It should be understood that the above-mentioned system is used to execute the method in the above embodiments. The implementation principle and technical effect of the corresponding program units in the system are similar to the description in the method, and the working process of the system may be referred to the corresponding process in the method, so details will not be repeated here.

Figure 10:
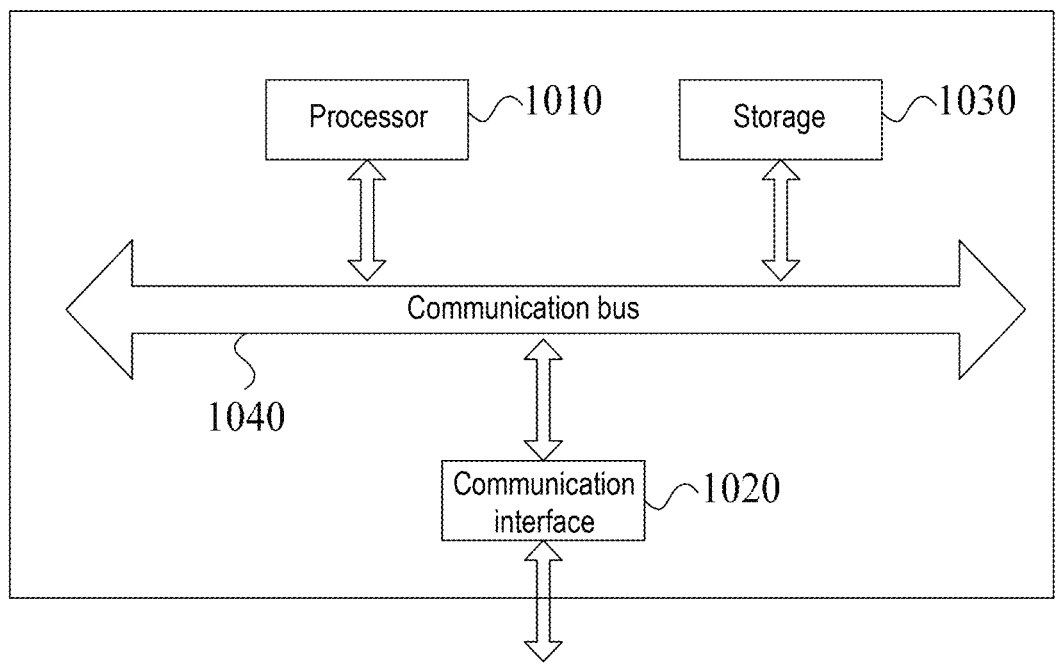
FIG. 10 is a structural diagram of an electronic system provided by an embodiment of the disclosure.

Based on the method in the embodiments, an electronic device is provided according to an embodiment of the disclosure. As shown in FIG. 10, the electronic device includes: a processor 1010, a communication interface 1020, a storage 1030, and a communication bus 1040. The processor 1010, the communication interface 1020, and the storage 1030 complete communication with each other via the communication bus 1040. The processor 1010 may call the logic commands in the storage 1030 to execute the method in the embodiments.

In addition, when the logic commands in the storage 1030 are implemented in the form of software functional units and sold or used as independent products, the logic commands may be stored in a computer-readable storage medium. Based on this understanding, the technical solution of the disclosure or the part that contributes to the prior art or part of the technical solution may be embodied in the form of a software product. The computer software product is stored in a storage medium and includes several commands to enable a computer device (which may be a personal computer, server, or network device, etc.) to execute all or part of the steps of the method described in each embodiment of the disclosure.

Based on the method in the embodiments, a computer-readable storage medium is provided according to an embodiment of the disclosure. The computer-readable storage medium stores a computer program, and when the computer program runs on a processor, the processor executes the method in the embodiments.

Based on the method in the embodiments, a computer program product is provided according to an embodiment of the disclosure. When the computer program product runs on a processor, the processor executes the method in the embodiments.

It should be understood that the processor in the embodiments of the disclosure may be a central processing unit (CPU), may also be other general-purpose processors, digital signal processors (DSP), application specific integrated circuit (ASIC), field programmable gate array (FPGA), or other programmable logic devices, transistor logic devices, hardware components or combinations thereof. A general purpose processor may be a microprocessor or any conventional processor.

The steps of the method in the embodiments of the disclosure may be implemented by hardware, or by a processor executing software commands. The software commands may comprise corresponding software modules, and the software modules may be stored in random access memory (RAM), flash memory, read-only memory (ROM), programmable ROM (PROM), erasable PROM (EPROM), electrically EPROM (EEPROM), register, hard disk, mobile hard disk, CD-ROM, or any other form of storage media known in the art. An exemplary storage medium is coupled to the processor such that the processor may read information from, and write information to, the storage medium. Certainly, the storage medium may also be an integral part of the processor. The processor and the storage medium may reside in an ASIC.

In the embodiments, all or part of the embodiments may be implemented by software, hardware, firmware, or any combination thereof. When implemented using software, all or part of the implementation may be in the form of a computer program product. The computer program product comprises one or more computer commands. When the computer program commands are loaded and executed on a computer, the process or function described in the embodiments of the disclosure is generated in whole or in part. The computer may be a general purpose computer, a special purpose computer, a computer network, or other programmable device. The computer commands may be stored in the computer-readable storage medium or transmitted via the computer-readable storage medium. The computer commands may be sent from a website, computer, server, or data center via a wired (for example, coaxial cable, optical fiber, digital subscriber line (DSL)) or wireless (for example, infrared, wireless, microwave) manner to another website, computer, server, or data center. The computer-readable storage medium may be any available medium that may be accessed by a computer or may be a data storage device such as a server or a data center including one or more available media. The available medium may be a magnetic medium (for example, a floppy disk, a hard disk, a magnetic tape), an optical medium (for example, a DVD), or a semiconductor medium (for example, a solid state disk (SSD)).

It should be understood that the various numerical numbers involved in the embodiments of the disclosure are only used for the convenience of description and are not used to limit the scope of the embodiments of the disclosure.

It is understood by persons skilled in the art that the above description is only preferred embodiments of the disclosure and the embodiments are not intended to limit the disclosure. Any modifications, equivalent substitutions, and improvements made within the spirit and principles of the disclosure should be included in the protection scope of the disclosure.

What is claimed is:

1. An adaptive STSMC hierarchical control method for depth tracking oriented to an underwater vehicle, comprising:

adopting an adaptive line-of-sight guidance algorithm to estimate an angle of attack of the underwater vehicle in real time, so as to obtain an expected pitch angle of the underwater vehicle;

adopting a nonlinear interference observer based on a sliding mode surface error to observe unknown interference of the underwater vehicle; and adopting a super-twisting sliding mode (STSMC) controller with adaptive saturation compensation to obtain an expected control rudder angle of the underwater vehicle in combination with the sliding mode surface error, the expected pitch angle, and an observed value of the unknown interference, wherein the adaptive saturation compensation is performed by compensating a rudder angle based on a saturation deviation of the rudder angle, and the saturation deviation of the rudder angle is determined by a difference between the expected control rudder angle calculated at a previous moment and an actual output rudder angle at the previous moment, wherein the actual output rudder angle is obtained through a rudder angle sensor installed on an elevator rudder of the underwater vehicle, and wherein the expected control rudder angle is transmitted to a rudder actuator to physically adjust the pitch angle and depth of the underwater vehicle, thereby providing improved depth tracking performance through enhanced robustness against complex time-varying interference, reduced control oscillations, and mitigation of rudder angle saturation effects, wherein the expected control rudder angle $\delta_s$ is:

$$\delta_s = \left(-k_\alpha |\theta_s|^{\frac{1}{2}} \text{sign}(\theta_s) - \int_0^\tau k_\gamma \text{sign}(\theta_s) d\tau - A_{\theta m} - \hat{H}_{\theta d} + \ddot{\theta}_d - \lambda_s \dot{\theta}_e\right)/B_{\theta s} + \delta_c$$

wherein $k_\alpha$ and $k_\gamma$ are parameters of STSMC, $\theta_s$ represents the sliding mode surface error, sign(·) represents a sign function, $\tau$ represents time, $\int_0^\tau k_\gamma \text{sign}(\theta_s) d\tau$ represents an integral of $k_\gamma \text{sign}(\theta_s)$ within a [0, t] time interval, $A_{\theta m}$ and $B_{\theta s}$ represent parameters related to the underwater vehicle, $\hat{H}_{\theta d}$ represents the observed unknown interference, $\theta_d$ represents the expected pitch angle, $\ddot{\theta}_d$ represents a second order differential of the expected pitch angle, $\lambda_s$ represents a sliding mode surface gain coefficient, $\theta_e$ represents a pitch angle tracking error, $\dot{\theta}_e$ represents a first order differential of the pitch angle tracking error, and $\delta_c$ represents a compensating rudder angle determined according to the saturation deviation of the rudder angle.

2. The method according to claim 1, wherein the nonlinear interference observer comprises the following formula:

$$\begin{cases} \hat{H}_{\theta d} = \alpha_\theta + L_\theta \theta_s \\ \dot{\alpha}_\theta = -L_\theta \alpha_\theta - L_\theta \left( L_\theta \theta_s + A_{\theta m} + B_{\theta s} \delta_s - \ddot{\theta}_d + \lambda_s \dot{\theta}_e \right) \end{cases}$$

wherein $\hat{H}_{\theta d}$ represents the unknown interference observed by the observer, $L_\theta$ represents a parameter of the nonlinear interference observer, $\alpha_\theta$ represents an auxiliary variable of the nonlinear interference observer, $\dot{\alpha}\theta$ represents a first order differential of $\alpha_\theta$, $\theta_s$ represents the sliding mode surface error, $A_{\theta m}$ and $B_{\theta s}$ represent parameters related to the underwater vehicle, $\theta_d$ represents the expected pitch angle, $\ddot{\theta}_d$ represents a second order differential of the expected pitch angle, $\lambda_s$ represents a sliding mode surface gain coefficient, $\theta_e$ represents a pitch angle tracking error, and $\dot{\theta}_e$ represents a first order differential of the pitch angle tracking error.

3. The method according to claim 2, wherein the sliding mode surface error $\theta_s$ is:

$$\theta_s = \dot{\theta}_e + \lambda_s \theta_e.$$

4. An electronic device, comprising
at least one storage configured to store a computer program; and
at least one processor configured to execute the program stored in the storage, wherein in response to the program stored in the storage being executed, the processor is configured to execute the method according to claim 2.

5. The method according to claim 1, wherein the sliding mode surface error $\theta_s$ is:

$$\theta_s = \dot{\theta}_e + \lambda_s \theta_e.$$

6. An electronic device, comprising
at least one storage configured to store a computer program; and
at least one processor configured to execute the program stored in the storage, wherein in response to the program stored in the storage being executed, the processor is configured to execute the method according to claim 5.

7. The method according to claim 1, wherein the compensating rudder angle $\delta_c$ is:

$$\delta_c = K_c \vartheta$$
$$\dot{\vartheta} = -K_\vartheta \vartheta + \Delta_\delta$$
$$\Delta_\delta = \delta_u - \delta_s(k-1)$$
$$\delta_u = \begin{cases} \operatorname{sign}(\delta_s(k-1))\overline{\delta}_s, & |\delta_s(k-1)| \geq \overline{\delta}_s \\ \delta_s(k-1), & |\delta_s(k-1)| < \overline{\delta}_s \end{cases}$$

wherein $K_c$ represents an adaptive saturation compensation parameter, $\vartheta$ is an adaptive variable, $\dot{\vartheta}$ is an adaptive law of the adaptive variable $\vartheta$, $K_\vartheta$ represents an adaptive law parameter, $\Delta_\delta$ represents the saturation deviation of the rudder angle, $\delta_u$ represents the actual output rudder angle of an elevator at the previous moment, $\overline{\delta}_s$ represents a rudder angle boundary that the elevator may output, and $\delta_s(k-1)$ represents the expected control rudder angle obtained at the previous moment.

8. An electronic device, comprising
at least one storage configured to store a computer program; and
at least one processor configured to execute the program stored in the storage, wherein in response to the program stored in the storage being executed, the processor is configured to execute the method according to claim 5.

9. The method according to claim 1, wherein the adaptive line-of-sight guidance algorithm comprises the following formula:

$$\begin{cases} \theta_d = \arctan(z_e/D_L + \hat{\alpha}) \\ \dot{\hat{\alpha}} = \dfrac{\kappa U D_L z_e}{\sqrt{D_L^2 + (z_e + D_L \hat{\alpha})^2}} \end{cases}$$

wherein, $\theta_d$ represents the expected pitch angle, arctan (·) represents an arctangent function, $Z_e$ represents a depth tracking error, $D_L$ and $\kappa$ represent adaptive line-of-sight guidance law parameters, $\hat{\alpha}$ represents the estimated angle of attack of the underwater vehicle, $\dot{\hat{\alpha}}$ represents a first order differential of $\hat{\alpha}$, and U represents a resultant velocity of the underwater vehicle in a depth plane.

10. An electronic device, comprising
at least one storage configured to store a computer program; and
at least one processor configured to execute the program stored in the storage, wherein in response to the program stored in the storage being executed, the processor is configured to execute the method according to claim 9.

11. An electronic device, comprising
at least one storage configured to store a computer program; and
at least one processor configured to execute the program stored in the storage, wherein in response to the program stored in the storage being executed, the processor is configured to execute the method according to claim 1.

12. An adaptive STSMC hierarchical control system for depth tracking oriented to an underwater vehicle, comprising:
an expected pitch angle determination unit configured to adopt an adaptive line-of-sight guidance algorithm to estimate an angle of attack of the underwater vehicle in real time, so as to obtain an expected pitch angle of the underwater vehicle;
an unknown interference observation unit configured to adopt a nonlinear interference observer based on a sliding mode surface error to observe unknown interference of the underwater vehicle; and
a control rudder angle calculation unit configured to adopt a super-twisting sliding mode (STSMC) controller with adaptive saturation compensation to obtain an expected control rudder angle of the underwater vehicle in combination with the sliding mode surface error, the expected pitch angle, and an observed value of the unknown interference, wherein the adaptive saturation compensation is performed by compensating a rudder angle based on a saturation deviation of the rudder angle, and the saturation deviation of the rudder angle is determined by a difference between the expected control rudder angle calculated at a previous moment and an actual output rudder angle at the previous moment, wherein the expected control rudder angle $\delta_s$ calculated by the control rudder angle calculation unit is:

$$\delta_s = \left(-k_\alpha |\theta_s|^{\frac{1}{2}} \text{sign}(\theta_s) - \int_0^t k_\gamma \text{sign}(\theta_s) d\tau - A_{\theta m} - \hat{H}_{\theta d} + \ddot{\theta}_d - \lambda_s \dot{\theta}_e\right)/B_{\theta s} + \delta_c$$

wherein $k_\alpha$ and $k_\gamma$ are parameters of STSMC, $\theta_s$ represents the sliding mode surface error, sign (·) represents a sign function, $\tau$ represents time, $\int_0^t k_\gamma$ sign $(\theta_s)d\tau$ represents an integral of $k_\gamma$sign $(\theta_s)$ within a [0, t] time interval, $A_{\theta m}$ and $B_{\theta s}$ represent parameters related to the underwater vehicle, $\hat{H}_{\theta d}$ represents the observed unknown interference, $\theta_d$ represents the expected pitch angle, $\ddot{\theta}_d$ represents a second order differential of the expected pitch angle, $\lambda_s$ represents a sliding mode surface gain coefficient, $\theta_e$ represents a pitch angle tracking error, $\dot{\theta}_e$ represents a first order differential of the pitch angle tracking error, and $\delta_c$ represents a compensating rudder angle determined according to the saturation deviation of the rudder angle.

13. The system according to claim 12, wherein the compensating rudder angle $\delta_c$ adopted by the control rudder angle calculation unit is:

$$\delta_c = K_c \vartheta$$
$$\dot{\vartheta} = -K_\vartheta \vartheta + \Delta_\delta$$
$$\Delta_\delta = \delta_u - \delta_s(k-1)$$
$$\delta_u = \begin{cases} \text{sign}(\delta_s(k-1))\overline{\delta}_s, & |\delta_s(k-1)| \geq \overline{\delta}_s \\ \delta_s(k-1), & |\delta_s(k-1)| < \overline{\delta}_s \end{cases}$$

wherein $K_c$ represents an adaptive saturation compensation parameter, $\vartheta$ is an adaptive variable, $\dot{\vartheta}$ is an adaptive law of the adaptive variable $\vartheta$, $K_\vartheta$ represents an adaptive law parameter, $\Delta_\delta$ represents the saturation deviation of the rudder angle, $\delta_u$ represents the actual output rudder angle of an elevator at the previous moment, $\overline{\delta}_s$ represents a rudder angle boundary that the elevator may output, and $\delta_s(k-1)$ represents the expected control rudder angle obtained at the previous moment.

* * * * *